United States Patent [19]

Orthey

[11] Patent Number: 5,243,762
[45] Date of Patent: Sep. 14, 1993

[54] GARDEN SHEARS

[75] Inventor: Gebhard Orthey, Nauroth, Fed. Rep. of Germany

[73] Assignee: Wolf-Gerate GmBH Vertriebsgesellschaft KG, Fed. Rep. of Germany

[21] Appl. No.: 936,940

[22] Filed: Aug. 28, 1992

[30] Foreign Application Priority Data

Aug. 30, 1991 [DE] Fed. Rep. of Germany ... 9110771[U]

[51] Int. Cl.5 .................. B26B 13/00; B26B 13/22; B26B 13/26
[52] U.S. Cl. .................................. 30/254; 30/262; 30/267
[58] Field of Search ............... 30/226, 239, 244, 254, 30/256, 261, 262, 266, 267, 92, 94

[56] References Cited

U.S. PATENT DOCUMENTS

| | | | |
|---|---|---|---|
| 822,441 | 6/1906 | Forbes | 30/92 |
| 2,310,959 | 2/1943 | James | 30/262 |
| 2,685,735 | 8/1954 | Sorensen | 30/267 |
| 2,776,482 | 1/1957 | Hafekost | 30/267 |
| 3,355,200 | 11/1967 | Storch | 30/267 |
| 3,672,053 | 6/1972 | Wiss | 30/267 |
| 3,740,846 | 6/1973 | Duffy | 30/267 |
| 4,156,311 | 5/1979 | Wallace et al. | 30/262 |
| 4,473,947 | 10/1984 | Ishida et al. | 30/267 |

FOREIGN PATENT DOCUMENTS

| | | | |
|---|---|---|---|
| 2636557 | 3/1990 | France | 30/262 |
| 1230539 | 5/1986 | U.S.S.R. | 30/262 |
| 1034454 | 6/1966 | United Kingdom | 30/267 |

*Primary Examiner*—Frank T. Yost
*Assistant Examiner*—Paul M. Heyrana
*Attorney, Agent, or Firm*—Ostrolenk, Faber, Gerb & Soffen

[57] ABSTRACT

A garden shears is provided with replaceable knives mounted on elongated grips which are connected at a pivot joint that is constructed of a steel bushing that takes up radial loads (shear and flexure). Axial loads are taken up by a screw bushing which passes through the steel bushing and a joint screw threadably engaged with the screw bushing. Both the joint screw and the screw bushing have widened shallow heads with slightly convex surfaces that pass into surfaces of the shears. The replaceable knives are supported at the rear by extensions of the respective grips in a manner such that the knives are not required to take up bending moments.

15 Claims, 3 Drawing Sheets

GARDEN SHEARS

The present invention relates to garden shears having the features set forth in the preamble to claim 1. Such garden shears are known from EP-A-0 352 982.

The object of the present invention is further to increase the ease of operation of such shears by reliably avoiding the spreading apart of the knives upon cutting and to improve the guidance of the shears without the danger of their catching on the material being cut by avoiding protruding parts.

The object is achieved by the features set forth in the body of claim 1. By the inserted steel bushing, the result is obtained that the shearing or bending load occurring upon the cutting is taken up without the knives spreading apart, this function being also improved by the widened shape of the head of the pivot screws or pivot bushing which take up the axial load.

The shears grips, which are produced by aluminum diecasting, together with the arrangement of the joint result in a clear linear guidance, the shaping of the grips and of the joint parts being developed substantially the same on both sides.

In connection with the development of the joint, a flat but stable construction without protruding nuts or screw heads has been obtained, while at the same time adjustment of the shear blades is possible and the clamped position set is secured by a detent disk.

The replaceable knives are supported from the rear by parts of the shear grips and therefore need not themselves take up the bending stress via the joint arrangement, as is necessary in the prior art. The mating knife is subjected only to slight wear as a result of its relatively insensitive crescent shape and is not replaced in normal operation and therefore is riveted to the sickle-shaped extension of the upper grip. If necessary, however, replacement is possible by loosening the rivets. The cutting edge is ground with the upper grip in order to compensate for tolerances and at the same time form a rough surface which secures the material being cut against slipping out. The remaining surfaces of the knife blade are coated with Teflon. The upper knife, due to its slender shape, is subject to greater wear and can easily be replaced if necessary. The Teflon coating, which is also provided on the knife blade, prevents the building-up of residues of plant sap on the cutting edge and, in the case of harder woods, results in a cut which is 30 to 40% easier.

One embodiment of the invention will be described below with reference to the drawing, in which.

Figure 1:
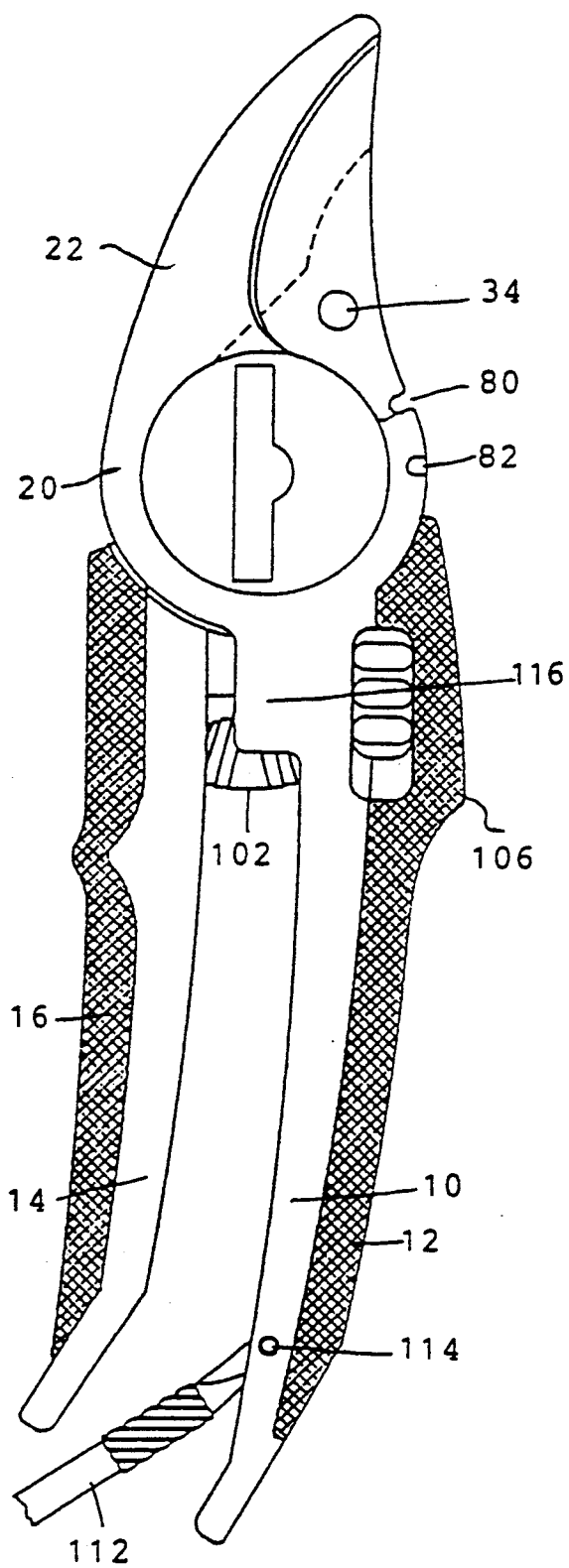
FIG. 1 is a front view of garden shears constructed in accordance with the instant invention.

The shears have an upper grip 10 with grip shell 12 and a lower grip 14 with grip shell 16. The grips 10 and 14 consist of aluminum diecastings and the grip shells consist of plastic. The two grips are connected to each other by a shear joint with pivot pin 18. In the region of the joint both grips are developed in the form of annular disks and extend beyond the joint into the region of the cutting knives. The ring-shaped joint section 20 of the upper grip 10 is continued in a crescent shaped section 22. In the region of its sections 20 and 22, the upper grip 10 bears the mating knife 24 the external peripheral shape of which is adapted to the sections 20 and 22 of the upper grip 10. This mating knife 24 is connected to the upper grip by rivets 26. Since this mating knife is subjected to less wear, it can be firmly fastened by these rivets to the upper grip 10. If necessary, however, replacement is possible by loosening the rivets. The rivets 26 are produced by diecasting together with the upper grip 10 and therefore are not visible from in front (FIG. 1).

Figure 2:
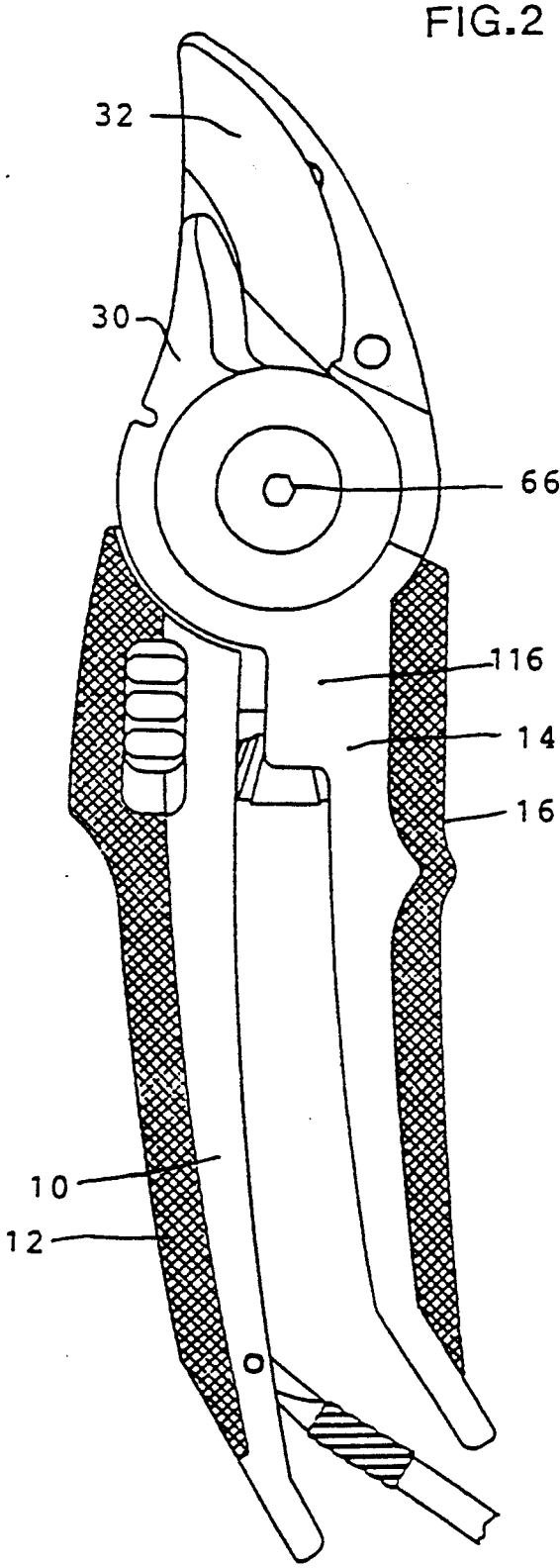
FIG. 2 is a rear view of FIG. 1.
Figure 5:
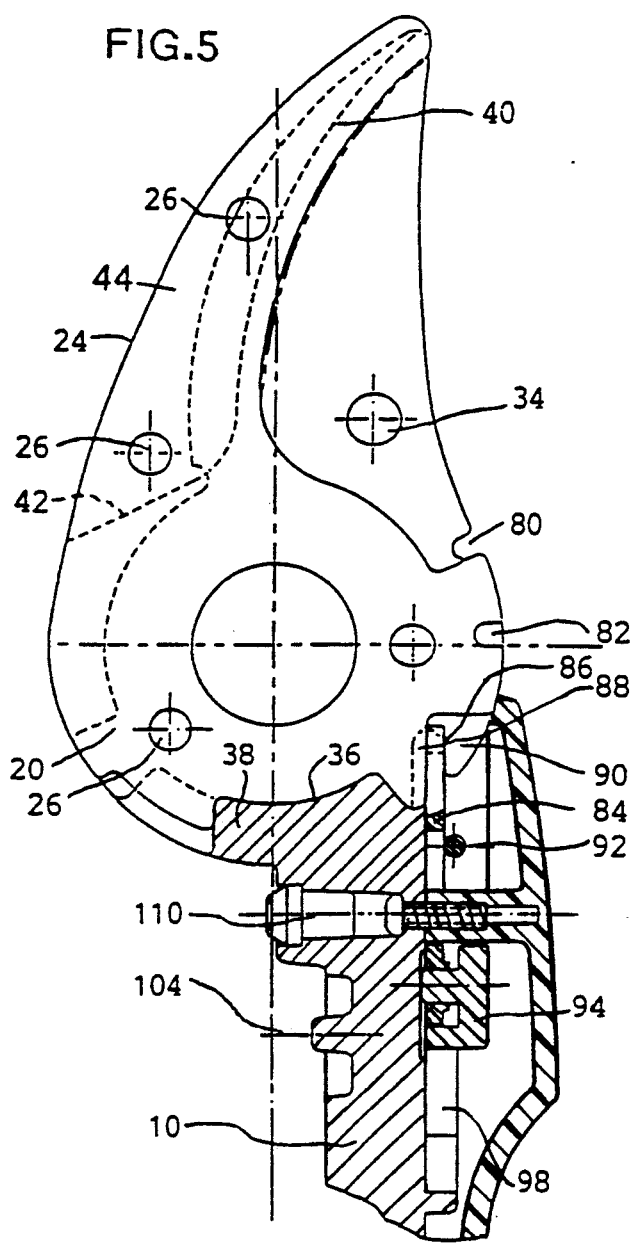
FIG. 5 is a cross section along the line 5—5 of FIG. 6.

The lower grip 14 also has a ring-shaped joint section 28 as well as a finger-like extension 30. The knife blade 32 which cooperates with the mating knife 24 and lies free in the region of the cutting edge is supported by these sections 28 and 30, i.e. the finger-like extension 30 extends, as can be noted in particular from FIG. 2, only over the rear lower section of the knife blade 32 so that the cutting region of the blade lies free and unimpeded cutting is possible. The finger-like extension 30 is flattened towards the blade, whereby a favorable guidance for the material being cut is obtained. On its inner side, the extension 30 has a pin 34 developed thereon, which pin extends into a hole in the knife blade 32 and thereby produces a form-locked connection in circumferential direction. Another form-locked connection, not visible in the drawing, is present in the disk-shaped section on the opposite side. Here, the knife blade 24 is provided in its ring-shaped region with a sector cut-out, into which a corresponding projection of the ring-shaped joint section 20 protrudes. This form-locked connection is developed in the same way as shown in FIG. 5 for the mating knife 24. The mating knife has a sector-shaped cut-out 36 into which a correspondingly shaped projection of the joint section 20 extends.

The knife blade 32 lies flatly against the mating knife 24 in the ring-shaped section and in the 15 edge section lying in the same plane, which edge section is formed by the section 44 which is set back along the edge 42.

The joint has a steel bushing 46 which is held fast in a press seat in a hole in the ring-shaped section 20 of the upper grip 10. By an outwardly directed annular flange 48, the bushing rests against a corresponding annular step of the joint section 20 and extends through the hole in the mating knife 24 and through the joint hole in the knife blade 32.

A screw bushing 50 is inserted from the upper grip through the steel bushing 46, the screw bushing 50 having a flat outwardly convex shallow head 52 which engages on an annular recess 54 in the ring-shaped joint section 20 of the upper grip 10 so that on the top side (FIG. 1) the joint section is flat and catching on branches and the like is avoided.

Figure 3:
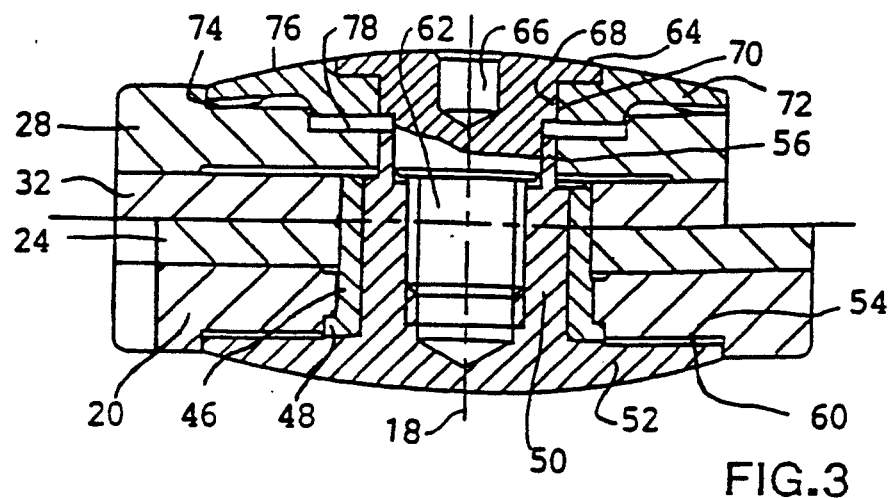
FIG. 3 is a cross-sectional view through the shears on a larger scale, seen at the height of the pivot pin.
Figure 4:
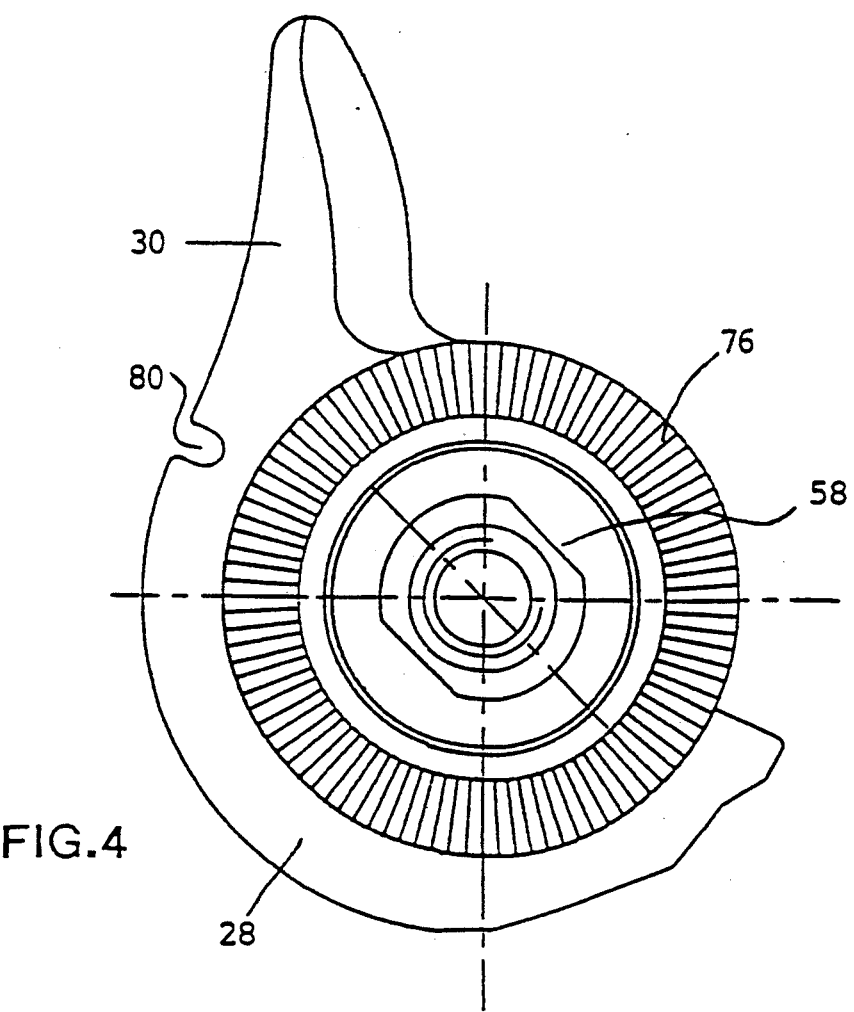
FIG. 4 is a partial view of the lower grip

The screw bushing 50, as can be noted from FIG. 3, engages in form-locked manner by its flattened end section 56 into a correspondingly shaped hole 58 in the ring-shaped joint section 28 of the lower grip 14, so that the head 52 of the screw bushing 50 is turnable relative to the ring-shaped joint section 20 and the mating knife 24 but connected, fixed in rotation, with the lower grip. In order to assure free turning, an annular slot 60 is provided between the depression 54 and the inner side of the head 52. A pivot screw 62 is screwed into the internal thread of the screw bushing 50. The pivot screw 62 has a flat outwardly convex shallow head 64 which is provided with a hexagon socket 66. Under its head, which is extended outward in flange-like manner, the pivot screw has a square 68 by which it enters, in form-locked manner, into a corresponding square hole 70 in a detent disk 72 which comes to lie in an annular recess 74 in the joint section 28 and has an outwardly slightly convex shape which passes into the surface of the section 28 and the surface of the head 64. Within the depression, the ring-shaped joint section 28 has detent means 76 in the form of radially extending teeth which cooperate with corresponding detent means 78 of the detent disk 72, which also consist of radially extending teeth.

By this flat shear joint which is integrated in the design, catching on branches or the like is prevented. The radial load is taken up by the steel bushing 46 and the axial load by the screw bushing 50, the pivot screw 62, and the detent disk 72. In this way, the shear forces and axial forces are taken up in different structural parts. The joint screw 62 assures a simple possibility for the resetting of the shear blades, the detent means 76 and 78 assuring the retention of the position set. After loosening the pivot screw and removing the lower grip the knife blade 32 can be simply lifted off and replaced or reground.

For the cutting of wire and the like, the knife blade 32 and, aligned with it, the extension 30 of the joint part 28 has an incision 80 which can be brought into coincidence with a corresponding incision in the upper knife 24. The wire cutter 80, 82 which is thus formed lies accordingly outside the cutting region of the knife blade 32, so that careless damage to the knife by the cutting of wire by means of the blade is avoided.

Figure 6:
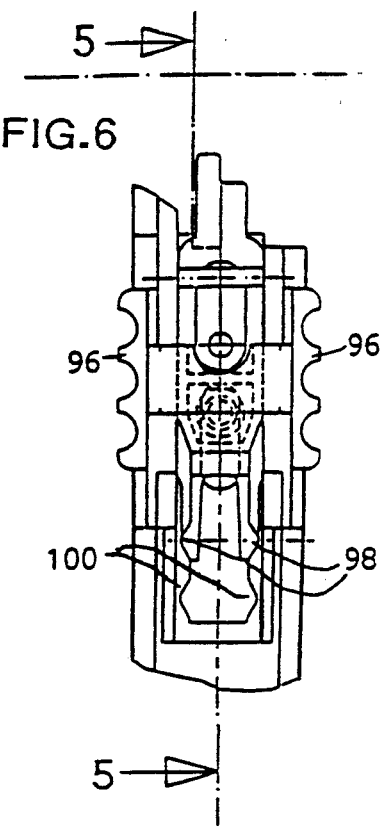
FIG. 6 is a view of the locking slide.
Figure 7:
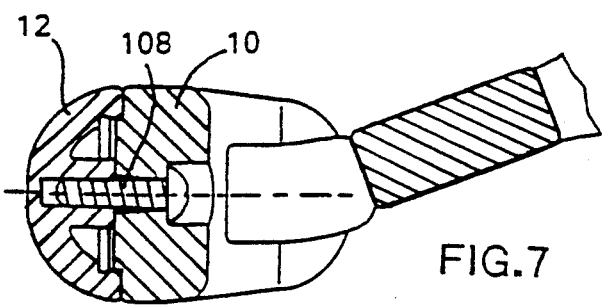
FIG. 7 is a sectional view of the upper grip showing the attachment of the grip shell.
Figure 8:
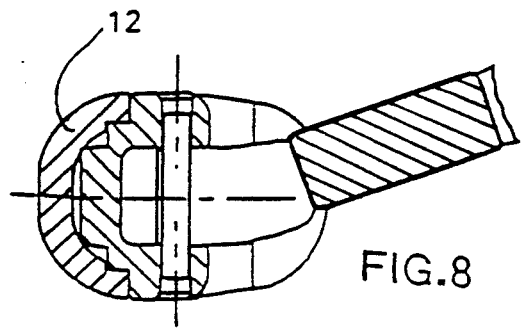
FIG. 8 is a sectional view through the upper grip showing the attachment of the hand loop.

The holding closed for the locking of the shears in the closed position is effected by a slide 84 which is mounted for longitudinal displacement in the upper grip 10. In the locking position shown in FIG. 5, this slide 84 engages into a slot 86 in the knife blade 32, and thus locks the lower grip with respect to the upper grip. At the same time, the slide, which consists of steel, acts on the rear edge 88 of a recess 90 in the mating knife 24 so that the two knifes are locked with respect to each other. The slide 84 travels on a flat surface of the upper grip 10 and is secured by a pin 92 which comes to lie on the opposite side of the slide 84. In this way, one side of the slide is always in engagement, while the other side is inserted into the slot of the upper knife 24 for the interlocking. A slide grip 94 of plastic, which protrudes with grip flutings 96 (FIG. 6) on both sides of the upper grip engages into the slide 84, so that this slide grip can be conveniently operated by both left-handed and right-handed persons. On the rear end of the slide, which is covered towards the outside by the grip shell 12, there are two spring detents 98 which engage in indentations 100 in the upper grip and prevent unintended closing or opening of the shears. The slide, mounted in this manner, does not come into contact with one's hand upon cutting, so that injuries are avoided. An opening spring 102 in traditional fashion produces a spreading apart of the grips 10 and 14; its ends are placed on extensions 104 of the handles 10 and 14, respectively.

The plastic shells 12 and 16 are provided on the diecast handles for skin-friendly convenience, for the covering of the locking slide and for a saving in weight. On the upper grip shell an elevation 106 is provided in the front region to prevent the forward slipping of the hand into the region of the locking slide. The upper grip shell 12 and the lower grip shell 14 are secured on all sides against shifting by a groove-rabbet connection. These shells are secured against being pulled off against the direction of force upon the cutting by, in each case, two screws 108. The shape of the handles is such that the opening spring 102 and a stop bumper 110 are covered, in the closed condition, on both sides by ribs 116. These ribs 116 serve also to stabilize the diecast parts. A considerable distance from the corresponding upper and lower handles is provided, which prevents the surfaces of the hand being clamped. For the same reasons, large radii are also provided at this place. A hand loop 112 is so placed on the rear end of the upper grip 10 that it gets along without disturbing protruding parts and does not get in the way upon working. The loop 112 is secured by a pin 114 which is inserted into a hole in the upper grip.

I claim:

1. Garden shears including an upper grip (10) provided with mating knife (24), a lower grip (14) provided with a knife blade (32) and a shears joint pivotally connecting said upper grip to said lower grip, said shears joint including first and second ring-shaped joint sections (20, 28) which run onto each other and a screw bushing (50) with a pivot screw (62) threadable engaged with said screw bushing, characterized by the fact that the shears joint also includes first means (46) for taking up the radial load and second means (50, 62) independent of said first means (46) to take up the axial load.

2. Garden shears according to claim 1, characterized by the fact that the first means for taking up the radial load comprises a steel bushing (46) which is forced into a concentric hole in the first ring-shaped joint section (20) of the upper grip (10) and supports the mating knife (24) and the knife blade (32).

3. Garden shears according to claim 2, characterized by the fact that the steel bushing (46) is anchored by a flange (48) in a stepped recess of the first ring-shaped joint section (20).

4. Garden shears according to claim 1, characterized by the fact that said second means for taking up the axial load are formed of a screw bushing (50) and a joint screw (62) threadably engaged with said screw bushing, said screw bushing and said joint screw having respective heads each with a weakly curved convex surface that passes into a surface of the respective ring-shaped joint sections (20, 28).

5. Garden shears according to claim 4, characterized by the fact that the head (52) of the screw bushing (50) is supported on the flange (48) of the steel bushing and on its inside is spaced from the bottom of an annular depression (54) which receives the head (52).

6. Garden shears according to claim 4, characterized by the fact that the screw bushing (50) is fixed against rotation relative to said joint section (28) by means of a flattened end section (56) that extends into operative engagement the annular joint section (28) of the lower grip.

7. Garden shears according to any of claim 4 characterized by the fact that a detent disk (72) is clamped by the head (64) of the clamping screw (62) axially against the ring-shaped joint section (28) and that said detent disk (72) bears, on its outer circumference, a detent means (76) which cooperates with a detent means (78) on the ring-shaped joint section (28).

8. Garden shears according to claim 7, characterized by the fact that the surface of detent disk (72) forms with the surface of the head (64) the slightly convexly curved joint plate which passes into the joint section (28).

9. Garden shears according to any of claim 1 characterized by the fact that the head (64) of the pivot screw (62) is provided with a hexagon socket (66).

10. Garden shears according to claim 1 in which such knives (24, 32) are detachable, characterized by the ring-shaped joint section (20) of the upper grip including a crescent-shaped extension (22) of the contour of which corresponds to the contour of the mating knife (24) and supports the latter over its entire surface.

11. Garden shears according to claim 10, characterized by having the ring-shaped joint section (28) of the lower grip include a finger-like extension (30) which supports the rear lower region of the knife blade (32).

12. Garden shears according to claim 10 characterized by having the mating knife riveted (26) on the crescent-shaped extension (22) and on the ring-shaped joint section (20) respectively.

13. Garden shears according to any of claim 1 characterized by the fact that outside the cutting region there are incisions (80 and 82) arranged in the ring-shaped joint sections (20, 28) of upper grip and lower grip and in the knives, said incisions acting as wire cutters.

14. Garden shears according to claim 10, characterized by having the mating knife aligned, on the edge section (40) facing the cutting edge of the knife blade, with the plane of the ring shaped joint section (20) and is set back along an edge (42) in the outwardly facing region (44).

15. Garden shears according to claim 1, characterized by the fact that the mating knife and knife blade are coated with Teflon.

* * * * *